US009636586B2

(12) United States Patent
Allen et al.

(10) Patent No.: US 9,636,586 B2
(45) Date of Patent: May 2, 2017

(54) GAME ADJUSTMENTS THROUGH CROWDSOURCING

(71) Applicant: International Business Machines Corporation, Armonk, NY (US)

(72) Inventors: Corville O. Allen, Morrisville, NC (US); James P. Brancato, Durham, NC (US); Tamera L. Davis, Raleigh, NC (US); John E. Diller, Durham, NC (US); Ollie J. Hales, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 14/183,577

(22) Filed: Feb. 19, 2014

(65) Prior Publication Data

US 2015/0231502 A1 Aug. 20, 2015

(51) Int. Cl.
A63F 9/24 (2006.01)
A63F 13/00 (2014.01)
A63F 13/63 (2014.01)
A63F 13/47 (2014.01)

(52) U.S. Cl.
CPC ............. *A63F 13/63* (2014.09); *A63F 13/47* (2014.09)

(58) Field of Classification Search
CPC .......... A63F 13/10; A63F 13/12; A63F 13/60; A63F 13/63; A63F 2300/60; A63F 2300/6009; A63F 2300/6018
See application file for complete search history.

(56) References Cited

U.S. PATENT DOCUMENTS

| 8,210,925 | B2* | 7/2012 | Johnson | A63F 13/12 463/23 |
| 8,241,116 | B2* | 8/2012 | Ocko | A63F 13/12 463/29 |
| 8,788,243 | B2* | 7/2014 | Peterson | G06F 11/3616 463/42 |
| 9,005,036 | B2* | 4/2015 | Laakkonen | A63F 13/12 463/30 |
| 2003/0220143 | A1* | 11/2003 | Shteyn | A63F 13/12 463/42 |
| 2004/0229698 | A1 | 11/2004 | Lind et al. | |
| 2006/0046854 | A1* | 3/2006 | Arevalo Baeza | A63F 13/12 463/42 |
| 2006/0128471 | A1* | 6/2006 | Willis | A63F 13/10 463/42 |
| 2006/0223600 | A1* | 10/2006 | Wisdom | A63F 13/10 463/1 |
| 2007/0066403 | A1* | 3/2007 | Conkwright | A63F 13/10 463/43 |
| 2007/0082741 | A1* | 4/2007 | Xu | A63F 13/10 463/43 |

(Continued)

*Primary Examiner* — Milap Shah
(74) *Attorney, Agent, or Firm* — Edward J. Wixted, III (57) ABSTRACT

In a method for selecting a game element of a game and adjusting the game element during execution of the game, a processor retrieves a plurality of received game element feedback data from a plurality of users of a game, wherein the plurality of received game element feedback data was selected from a list of possible game elements. A processor selects the game element to be adjusted, based upon the plurality of received game element feedback data. A processor causes the game element to be adjusted during execution of the game.

20 Claims, 4 Drawing Sheets

(56) References Cited

U.S. PATENT DOCUMENTS

| | | | | |
|---|---|---|---|---|
| 2007/0218987 A1* | 9/2007 | Van Luchene | A63F 13/10 | 463/30 |
| 2007/0298866 A1* | 12/2007 | Gaudiano | A63F 13/00 | 463/23 |
| 2008/0078758 A1* | 4/2008 | Shimura | A63F 13/10 | 219/717 |
| 2008/0092065 A1 | 4/2008 | Jung et al. | | |
| 2008/0255927 A1* | 10/2008 | Sispoidis | G06Q 30/02 | 705/7.31 |
| 2009/0113251 A1* | 4/2009 | Goossen | A63F 13/00 | 714/46 |
| 2009/0149246 A1* | 6/2009 | Opaluch | A63F 13/79 | 463/29 |
| 2009/0150344 A1* | 6/2009 | Herness | G06Q 10/06 | |
| 2009/0239661 A1* | 9/2009 | Acres | G07F 17/32 | 463/25 |
| 2010/0056276 A1* | 3/2010 | Silberstein | A61B 5/04008 | 463/36 |
| 2010/0144430 A1* | 6/2010 | Graham | A63F 13/12 | 463/29 |
| 2010/0144443 A1* | 6/2010 | Graham | A63F 13/12 | 463/42 |
| 2010/0144444 A1* | 6/2010 | Graham | A63F 13/10 | 463/42 |
| 2010/0146060 A1* | 6/2010 | Graham | A63F 13/10 | 709/206 |
| 2012/0077596 A1 | 3/2012 | Ocko et al. | | |
| 2012/0142429 A1* | 6/2012 | Muller | A63F 13/12 | 463/42 |
| 2012/0276964 A1 | 11/2012 | Jones et al. | | |
| 2012/0276993 A1* | 11/2012 | Lerner | A63F 13/10 | 463/31 |
| 2013/0303244 A1* | 11/2013 | Jensen | A63F 13/12 | 463/1 |
| 2014/0106837 A1* | 4/2014 | Lambert | A63F 1/18 | 463/11 |
| 2014/0179408 A1* | 6/2014 | Ducheneaut | G07F 17/326 | 463/23 |
| 2014/0194209 A1* | 7/2014 | Ziouvelou | A63F 13/12 | 463/42 |
| 2014/0200959 A1* | 7/2014 | Sarb | G06Q 30/0202 | 705/7.31 |

* cited by examiner

GAME ADJUSTMENTS THROUGH CROWDSOURCING

FIELD OF THE INVENTION

The present invention relates generally to the field of gaming, and more particularly to using crowdsourcing techniques to adjust how aspects of a game are presented to and experienced by users.

BACKGROUND OF THE INVENTION

A video game is an electronic game that involves human interaction with a user interface to generate visual feedback on a video device. Personal computers (PCs), video game consoles, smart phones, and other devices may act as a platform for a video game. Input devices such as keyboards, game controllers, or motion sensing and feedback devices may be used to provide input to the platform running the video game. Video games may include plot elements, missions, game settings, or other types of information that can be varied to affect the presentation or settings of the video game.

Crowdsourcing is the practice of obtaining needed services, ideas, information or content by soliciting contributions from a large group of people, and especially from an online community. For example, crowdsourcing techniques may solicit information through the use of an online poll or by receiving input from a large group of people.

SUMMARY

Aspects of an embodiment of the present invention disclose a method, computer program product, and computing system for selecting a game element of a game and adjusting the game element during execution of the game. A processor retrieves a plurality of received game element feedback data from a plurality of users of a game, wherein the plurality of received game element feedback data was selected from a list of possible game elements. A processor selects the game element to be adjusted, based upon the plurality of received game element feedback data. A processor causes the game element to be adjusted during execution of the game.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The present invention will now be described in detail with reference to the Figures.

Figure 1:
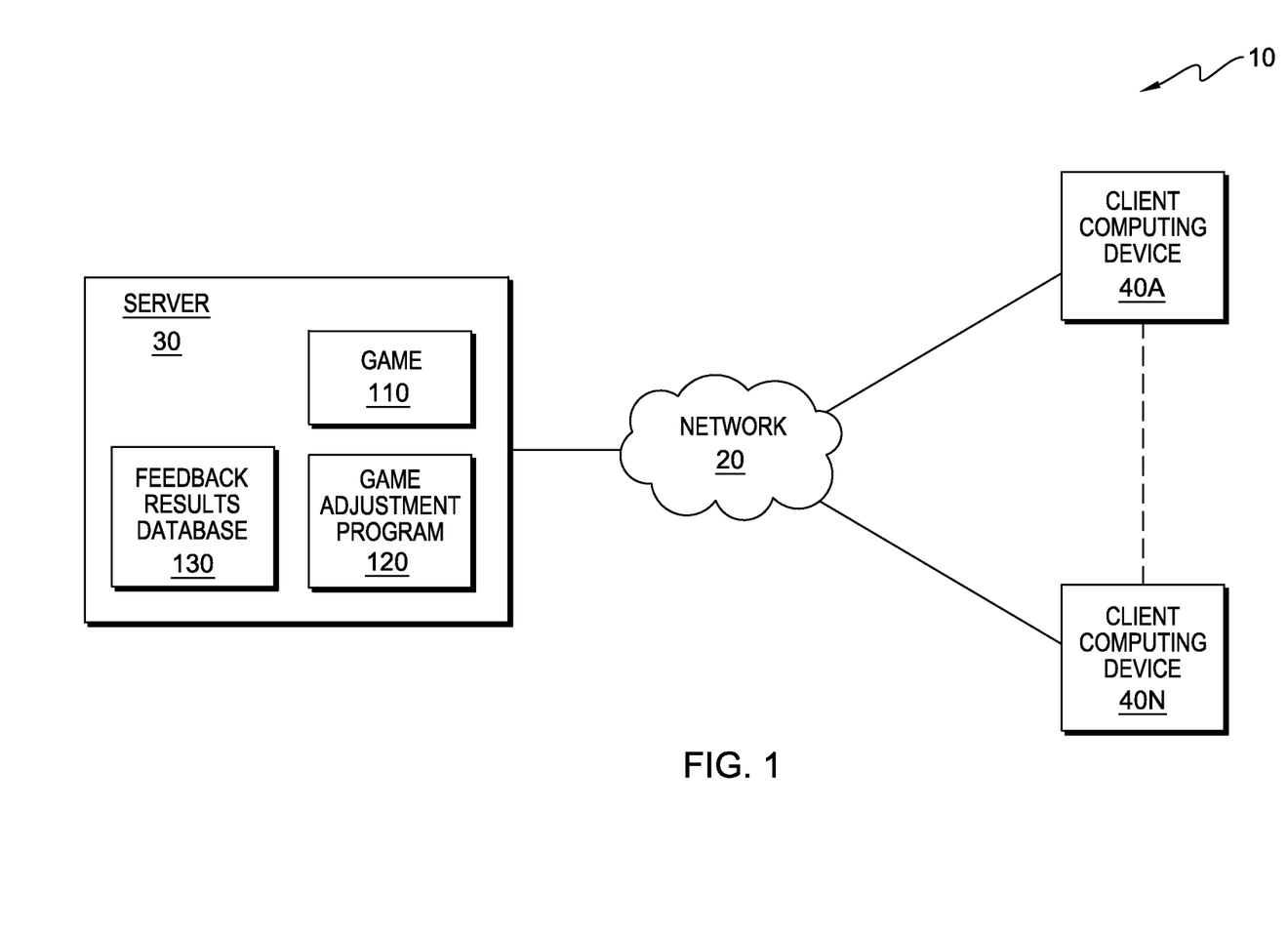
FIG. 1 depicts a diagram of a computing system, in accordance with one embodiment of the present invention.

FIG. 1 depicts a diagram of computing system 10, in accordance with one embodiment of the present invention. FIG. 1 provides only an illustration of one embodiment and does not imply any limitations with regard to the environments in which different embodiments may be implemented.

In the depicted embodiment, computing system 10 includes server 30 and client computing devices 40A-40N, interconnected over network 20. Network 20 may be a local area network (LAN), a wide area network (WAN) such as the Internet, any combination thereof, or any combination of connections and protocols that will support communications between server 30 and client computing devices 40A-40N in accordance with embodiments of the invention. Network 20 may include wired, wireless, or fiber optic connections. Computing system 10 may include additional computing devices, servers, computers, or other devices not shown.

Server 30 may be a management server, a web server, or any other electronic device or computing system capable of receiving and sending data. In some embodiments, server 30 may be a laptop computer, tablet computer, netbook computer, personal computer (PC), a desktop computer, a personal digital assistant (PDA), a smart phone, or any programmable electronic device capable of communicating with client computing devices 40A-40N via network 20. In other embodiments, server 30 may represent a server computing system utilizing multiple computers as a server system, such as in a cloud computing environment. Server 30 contains game 110, game adjustment program 120, and feedback results database 130. Server 30 may include components, as depicted and described in further detail with respect to FIG. 4.

Game 110 is a generic game program or software application. Game 110 may be any program or application that contains one or more adjustable game elements. Adjustable game elements may include a variety of adjustable aspects of the game, such as settings, modes, difficulty levels, story branches, or plot elements that can be selected in order to adjust one or more aspects of game 110. For example, game 110 may include a number of possible missions that can be presented to a user, and the adjustable game element may include each particular mission that may be presented to the user. In another example, game 110 may include a number of game modes, maps, and game settings. In such an example, the game modes, maps, and game settings may each be adjustable game elements. In yet another example, game 110 may be a plot-driven game containing multiple branches that can affect the direction of the plot of the game. In such an example, adjustable game elements may include aspects of the direction of the plot. Typically, game 110 will be a video game. However, in some embodiments, game 110 may be a software component of a game that includes other physical elements, such as a game board, game pieces, or arrangement configurations. In one embodiment, game 110 resides on server 30. In other embodiments, game 110 may reside on another server, another computing device, or on any of client computing devices 40A-40N, provided that game 110 has access to game adjustment program 120 and feedback results database 130, and provided that game 110 is accessible to game adjustment program 120. In some embodiments, game adjustment program 120 may be a function of game 110.

Game adjustment program 120 operates to receive game element selections and/or feedback data from users, such as users of client computing devices 40A-40N. Game adjustment program 120 also operates to adjust the settings, presentation, or other aspects of game 110 according to the selections and/or feedback data received from the group of users accessing game 110 from computing devices, such as client computing devices 40A-40N. In some embodiments, game adjustment program 120 also operates to provide an interface to users of client computing devices 40A-40N, such that potential game element selections and/or feedback data may be provided via the interface for selection of a game element for adjustment. In one embodiment, game adjustment program 120 resides on server 30. In other embodiments, game adjustment program 120 may reside on another server, another computing device, or any of client computing devices 40A-40N, provided that game adjustment program 120 has access to game 110 and feedback results database 130, and provided that game adjustment program 120 is accessible to game 110 (e.g., via network 20). In some embodiments, game adjustment program 120 may be a function of game 110.

Feedback results database 130 may be a repository that may be written and read by game 110 and game adjustment program 120. Received game element selections and/or feedback data, such as game modes, game settings, plot elements, difficulty levels, or other received selections and/or feedback data may be stored to feedback results database 130. In one embodiment, feedback results database 130 resides on server 30. In other embodiments, feedback results database 130 may reside on another server or another computing device, provided that feedback results database 130 is accessible to game 110 and game adjustment program 120.

Client computing devices 40A-40N may each be a desktop computer, laptop computer, netbook computer, tablet computer, personal digital assistant (PDA), or smart phone. In general, client computing devices 40A-40N may each be any electronic device or computing system capable of sending and receiving data, and communicating with server 30 over network 20. In embodiments of the invention, there may be any number of client computing devices 40A-40N. Client computing devices 40A-40N may each include components, as depicted and described in further detail with respect to FIG. 4.

Figure 2:
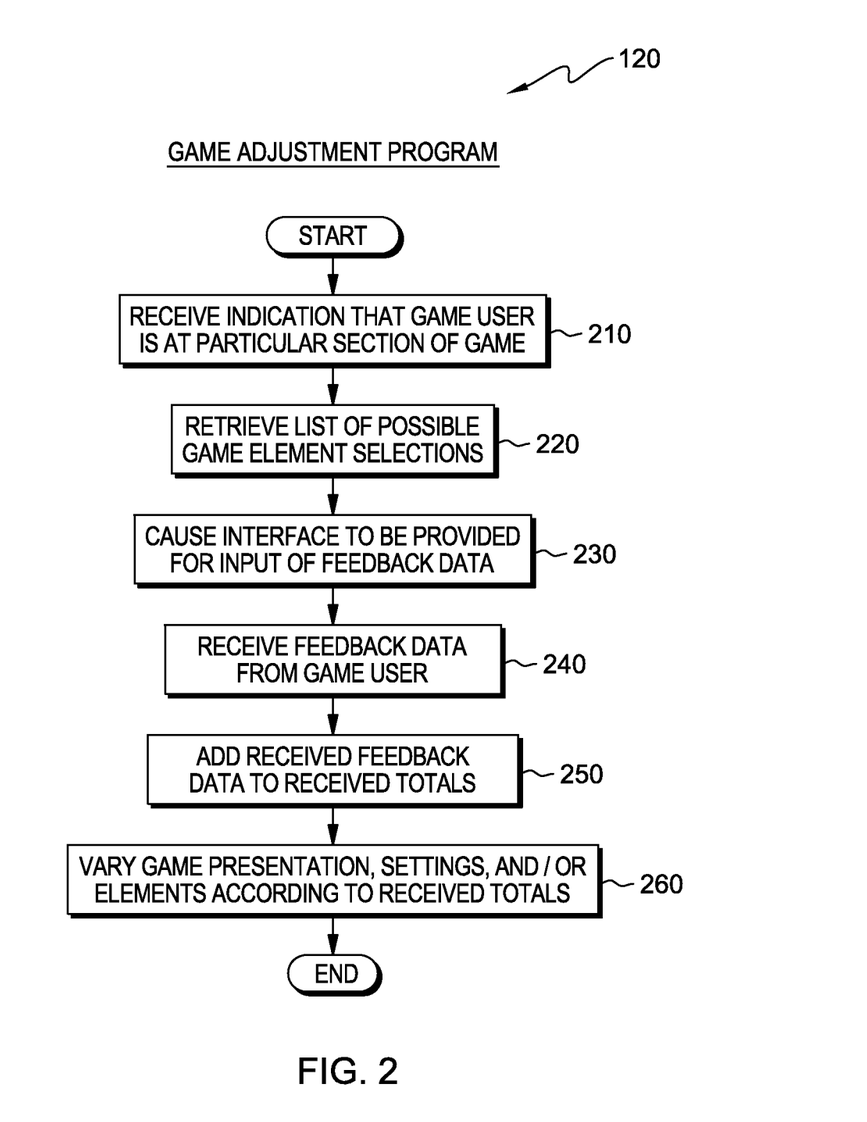
FIG. 2 depicts a flowchart of the steps of a game adjustment program executing within the computing system of FIG. 1, for varying game elements based on selections received, in accordance with one embodiment of the present invention.

FIG. 2 depicts a flowchart of the steps of game adjustment program 120, which executes within computing system 10 of FIG. 1, in accordance with an embodiment of the present invention. Game adjustment program 120 operates to provide a user interface (UI) to game users that allow the users to select a game element from a list of game element selections, or to otherwise provide feedback data. Game adjustment program 120 also operates to adjust the game presentation or game elements of game 110 for current or future game users based on selections received from large groups of game users.

In one embodiment, initially, a developer may write code for game 110 that includes options, elements, or presentation aspects of game 110 that game adjustment program 120 can select or adjust. For example, game 110 may include a series of missions, and game adjustment program 120 may use received selections and/or feedback data from game users of game 110 to determine the order of the missions, or to determine which one of the particular missions will be presented to one or more users of game 110. In another example, game 110 may include shorter game sessions that take place on a variety of maps and include different goals, point scoring methods, game character capabilities, or other options. In such an example, game adjustment program 120 may determine the frequency at which particular combinations of the aforementioned game settings appear to a user of game 110 based upon received selections or feedback data from game users of game 110 either at the beginning, end or during the particular game session. In yet another example, game 110 may include a variable that can affect the difficulty level of game 110, and game adjustment program 120 may be able to adjust the variable to increase or decrease the difficulty level of game 110 based on received selections or feedback data from users of game 110.

In step 210, game adjustment program 120 receives an indication that a game user is at a particular section of game 110. The section of game 110 may be any section of game 110 near a selectable option, element, or presentation aspect, as designated by the developer during development of game 110. For example, the section of game 110 indicated may be a particular plot location within the storyline of the game, during a mission selection screen, during a game mode and/or game settings selection screen, or at other sections of game 110. Alternatively, the indication may be that the game user has recently completed a particular section of game 110, such as a game round, mission, or level. Game adjustment program 120 may receive an indication from a computing device upon which a user is playing game 110, such as any one of client computing devices 40A-40N. Alternatively, game adjustment program 120 may monitor users accessing game 110 to determine when each user is at a particular section of game 110.

In step 220, game adjustment program 120 retrieves a list of possible game element selections for the particular section of game 110. In some embodiments, game adjustment program 120 retrieves the list of possible game element selections from the code of game 110. In other embodiments, game 110 may send a list of possible game element selections to game adjustment program 120 in response to receiving the indication that the game user is at the particular section of the game. Possible game element selections for game 110 may vary based upon the type of game and game element selections created by the developer of game 110. For example, game 110 may be a massively multiplayer online game (MMOG) or other game that includes a large free roaming world and a plurality of missions within that world. In such an example, game element selections may include a select number of the potentially available missions. In another example, game 110 may be plot-driven, and the possible game element selections may include character choices or other plot-driving factors that affect the direction in which the plot of game 110 might continue. In yet another example, game 110 may include a series of shorter game sessions with multiple selectable options such as map, objective, number of players, given items, or other options. In such an example, the possible game element selections may include any of the aforementioned selectable options, or combinations of those options. Other possible game element selections may include aspects of game 110, such as difficulty level, game settings, or any aspect of game 110 that may be adjusted, selected, or changed by game adjustment program 120.

In step 230, game adjustment program 120 provides an interface for the input of feedback data by a user at a client computing device, such as any one of client computing devices 40A-40N. In general, game adjustment program 120 may cause any interface to be provided that allows a user of game 110, either within game 110 or through the use of an external device or application, to input feedback data, or a game element selection. In some embodiments, game adjustment program 120 may use the retrieved possible game element selections (see step 220) to populate the contents of the interface. For example, game adjustment program 120 may present a user with a dialog box containing a multiple choice selection as to the user's preferences for the game element in question. In some embodiments, the interface may include a prompt or question indicating, to the game user, information related to the context of the selection, the affect the selection might have, or other information.

In some embodiments, game adjustment program 120 may cause an interface to be provided that allows for open-ended input by the game user, such as user-generated text or audio input. In embodiments that allow for audio input, game adjustment program 120 or a dedicated speech recognition program (not shown) may translate the received audio into text. In embodiments that accept open-ended input by a user, game adjustment program 120 or a dedicated natural language processing (NLP) program, such as NLP/Sentiment Analyzer 310 (see FIG. 3), may utilize natural language processing and at least one set of dictionaries and rules to perform text analytics on the received input to compare the received input to the applicable list of possible game element selections. Text analytics can be performed using an Unstructured Information Management Architecture (UIMA) application configured to analyze unstructured information to discover patterns by processing plain text and identifying entities or relations. The analysis of natural language may take keywords that indicate positive sentiments for a particular game element and treat the keywords as crowd sourced data for a degree of positive sentiment to be used in adjustments. Natural language processing and sentiment analysis will be further discussed in reference to FIG. 3.

In other embodiments, rather than causing an interface to be provided to users in a particular section of a game, game adjustment program 120 may utilize the natural language processing and text analytics methods discussed above to gather information and identify trends from text in dedicated online forums. Based on the text expressed by users in the dedicated online forums, game adjustment program 120 may similarly perform text analytics to compare the received input to the applicable list of possible game element selections.

In step 240, game adjustment program 120 receives the feedback data and/or game element selection from the user of game 110. Game adjustment program 120 may receive the feedback data and/or game element selection from the client computing device upon which the user is accessing game 110, such as any one of client computing devices 40A-40N. In some embodiments, the feedback data and/or game element selection may be linked to login credentials of the user, such as login credentials associated with game 110 or login credentials associated with a social network account. In other embodiments, the feedback data and/or game element selection may be linked to gamification data associated with the user. Gamification data includes information associated with a user, such as a badge, achievement, or other information relevant to the user's experience and/or ability level with regards to game 110. In embodiments using gamification data associations, the feedback data and/or game element selections may be grouped with other users having similar achievements, badges, or other gamification data. The type of feedback data and/or game element selection received may vary based upon the selectable options available within the developed constraints of game 110. The feedback data and/or game element selection received may correspond to one or more plot elements, maps, game settings, missions, character traits, usable items, difficulty settings, or variable game element selection possibilities, as dictated by game 110, as developed. For example, a received game element selection may indicate a particular mission, from a selection of multiple missions, that a user enjoyed most.

In step 250, game adjustment program 120 adds the feedback data and/or received game element selection, or set of game element selections to totals received from other game users and instances of use within game 110. Game adjustment program 120 may run multiple times to gather feedback data and/or game element selections from multiple users of game 110. Alternatively, copies of game adjustment program 120 may similarly gather feedback data and/or game element selections from additional users of game 110 and copies of game 110 located on other computing systems. Game adjustment program 120 may add the feedback data and/or received game element selection to a data repository, such as feedback results database 130, for further access by game adjustment program 120 and game 110.

In step 260, game adjustment program 120 adjusts application presentation, settings, and/or elements of game 110 according to received feedback data and/or game element selection totals from a plurality of users. In some embodiments, game adjustment program 120 may access received totals, such as the received totals stored to feedback results database 130, to make adjustments to game 110 for current game users. In other embodiments, game adjustment program 120 may cause adjustments to game 110 for future game users based on the received totals.

In an example embodiment of the present invention, at the end of a particular mission, level, or other game sequence, an interface may be provided to the user of game 110 that prompts the user to rate the difficulty of the previous mission or game sequence. Based on the results, as obtained from a large selection of users, game adjustment program 120 may cause game 110 to increase or decrease the difficulty level of the particular mission or game sequence in question. Alternatively, game 110 may be designed such that the game is initially easy and progresses to become more difficult. Based on the obtained difficulty impression information, game adjustment program 120 may cause game 110 to rearrange the order of missions or presentation of game sequences within game 110.

In another example embodiment of the present invention, one or more game settings may be selected for a round of game 110, and these settings may be, for example, randomly or otherwise selected before the start of each round. In such an example, an interface may be provided including one or more game settings, or combination of game settings, as possible game element selections. Alternatively, users may merely be prompted to provide feedback data and provide a rating that indicates approval or disapproval with the presented settings before, after, or both before and after a round of game 110 is complete. Based on results obtained from a selection of multiple users presented with the same or similar settings, game adjustment program 120 may increase or decrease the frequency at which particular game settings, or combinations of game settings, are presented to users. For example, game 110 may include a particular game mode that frequently is presented to the users, and a large group of users, such as a majority of the online community of game 110 may disapprove of the particular game mode and voice their disapproval through game adjustment program 120 and the provided interface. Based on these results, game adjustment program 120 may decrease the frequency of occurrence, or entirely eliminate the particular game mode in question from appearing to future game users.

Figure 3:
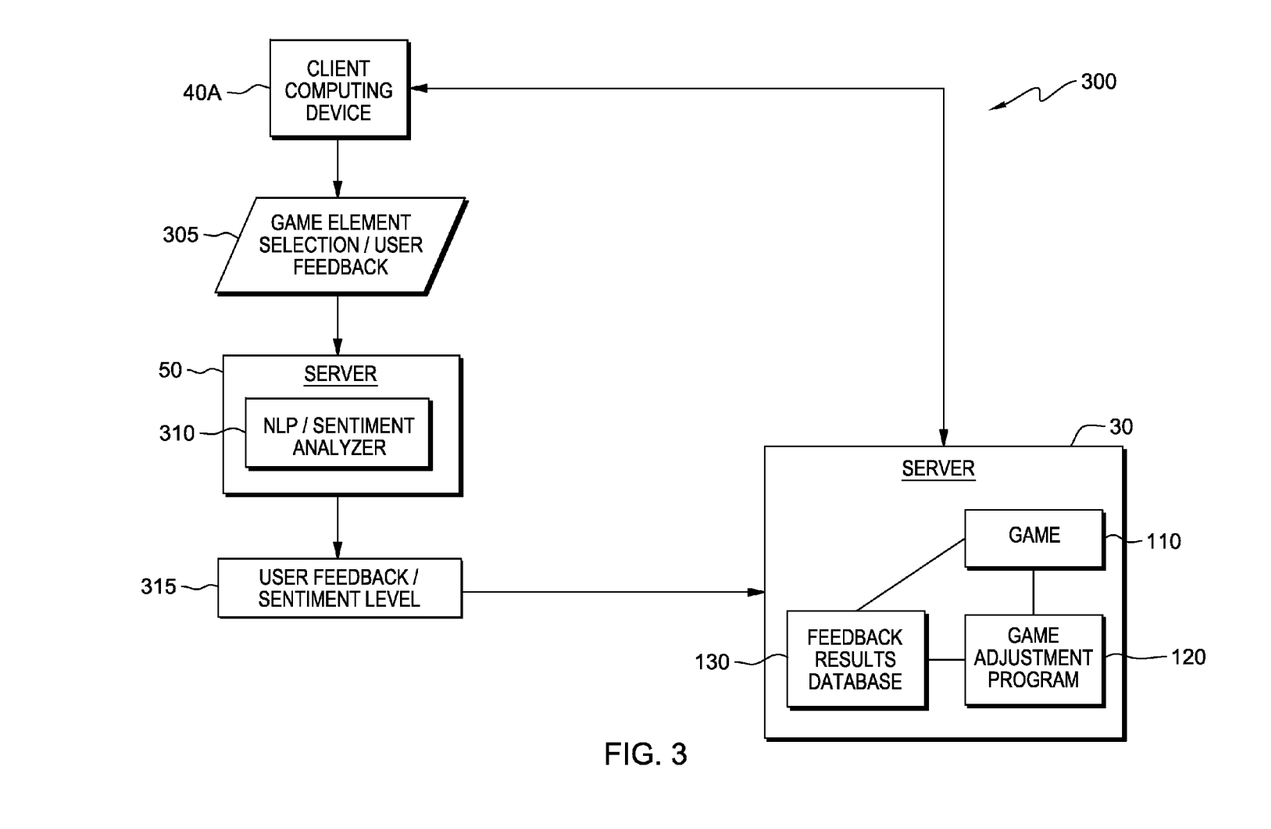
FIG. 3 depicts a use-case scenario including natural language processing (NLP), in accordance with one embodiment of the present invention.

FIG. 3 depicts a use-case scenario of an embodiment of the present invention. Scenario 300 includes client computing device 40A and server 30 (see FIG. 1). In addition, scenario 300 includes server 50.

Server 50 may be a management server, a web server, or any other electronic device or computing system capable of receiving and sending data. In some embodiments, server 50 may be a laptop computer, a PDA, a smart phone, or any programmable electronic device capable of communicating with client computing device 40A and server 30 via a network, such as network 20 (see FIG. 1). In other embodiments, server 50 may represent a server computing system utilizing multiple computers as a server system, such as in a cloud computing environment. Server 50 contains natural language processor (NLP)/sentiment analyzer 310. Server 50 may include components, as depicted and described in further detail with respect to FIG. 4.

NLP/sentiment analyzer 310 operates to utilize natural language processing and at least one set of dictionaries and rules to perform text analytics on the received input to compare the received input to the applicable list of possible game element selections. Text analytics can be performed using an Unstructured Information Management Architecture (UIMA) application configured to analyze unstructured information to discover patterns by processing plain text and identifying entities or relations. In one embodiment, NLP/sentiment analyzer 310 may use the input text to produce tuples. Each tuple may include a game element, sentiment or other relationship, and a keyword indicating information associated with the time or location in the game to which the received input applies (e.g., a particular mission, map, type of round, etc.). In one embodiment, the analysis of natural language may take keywords that indicate sentiments (e.g., positive, negative, too easy, too difficult) for a particular game element of game 110 and treat the keywords as crowd sourced data for a degree of sentiment to be used in adjustments to game 110. For example, a negative sentiment on how difficult or easy a particular game element is during gameplay may be used by game adjustment program 120 to adjust the game element of game 110 for current or future users. In one embodiment, NLP/sentiment analyzer 310 resides on server 50. In other embodiments, NLP/sentiment analyzer 310 may reside on another server, another computing device, any one of client computing devices 40A-40N, or server 30, provided that NLP/sentiment analyzer 310 is accessible to game adjustment program 120, and provided that NLP/sentiment analyzer 310 has access to feedback results database 130.

In depicted scenario 300, client computing device 40A is connected to game 110 through server 30 over network 20 (see FIG. 1), such that a user at client computing device 40A may interact with game 110. In other embodiments, game 110 may be installed to client computing device 40A. In scenario 300, game 110 utilizes game adjustment program 120.

In scenario 300, the user at client computing device 40A is at a point within game 110, or has otherwise opened an interface that allows for natural language input by the user, via either text or audio input. If the input is in audio form, game adjustment program 120 or a dedicated speech recognition program (not shown) may initially translate the received audio into text. If the input is text, or once the audio has been translated to text, the text may be sent to NLP/sentiment analyzer 310.

In scenario 300, the user-input text sent to NLP/sentiment analyzer 310 is represented by game element selection/user feedback data 305. As mentioned above, game element selection/user feedback data 305 may include any text input by the user referencing game 110. In some embodiments, game element selection/user feedback data 305 may be in response to a prompt generated by game adjustment program 120. In other embodiments, a user may choose to open an interface that allows the user to generally input user feedback in the form of text or audio, and that user feedback may be game element selection/user feedback data 305.

In scenario 300, NLP/sentiment analyzer 310 may receive game element selection/user feedback data 305 and utilize natural language processing and at least one set of dictionaries and rules to perform text analytics on the received input to compare the received input to the applicable list of possible game element selections. NLP/sentiment analyzer 310 may generate user feedback/sentiment level 315. User feedback/sentiment level data 315 may be data recovered from game element selection/user feedback 305 that corresponds with input data for game adjustment program 120. NLP/sentiment analyzer 310 may analyze the text for keywords and relationships to determine a game element, sentiment, and other keywords relating to an adjustable aspect of game 110. As previously discussed, adjustable aspects of game 110 could vary based upon the type of game and the game code. Adjustable aspects of game 110 could include, difficulty level, number of computer controlled characters, mission selection, mission order, game modes, or any other potentially adjustable aspects of game 110 as developed. For example, NLP/sentiment analyzer 310 may receive game element selection/user feedback 305 that says the following: "I found the warehouse mission to be way too easy." In such an example, a natural language processor such as NLP/sentiment analyzer 310 may produce user feedback/sentiment level 315 indicating the particular mission (i.e., warehouse), the sentiment (e.g., too easy, negative, not difficult, etc.), and a game element (i.e., difficulty level).

In scenario 300, user feedback/sentiment level 315 will send generated user feedback (depicted as user feedback/sentiment level data 315) to game adjustment program 120, or alternatively, user feedback/sentiment level data 315 may be added to feedback results database 130 for use by game adjustment program 120. Using user feedback/sentiment level data 315 and other data collected through NLP/sentiment analyzer 310 or by other methods (e.g., multiple choice selection, etc.), game adjustment program 120 may adjust aspects of game 110, as previously indicated with regard to FIG. 2.

While scenario 300 specifically mentions client computing device 40A, other client computing devices, such as client computing devices 40A-40N, may similarly utilize a natural language processing program, such as NLP/sentiment analyzer 310, to input information for potential use by game adjustment program 120.

Figure 4:
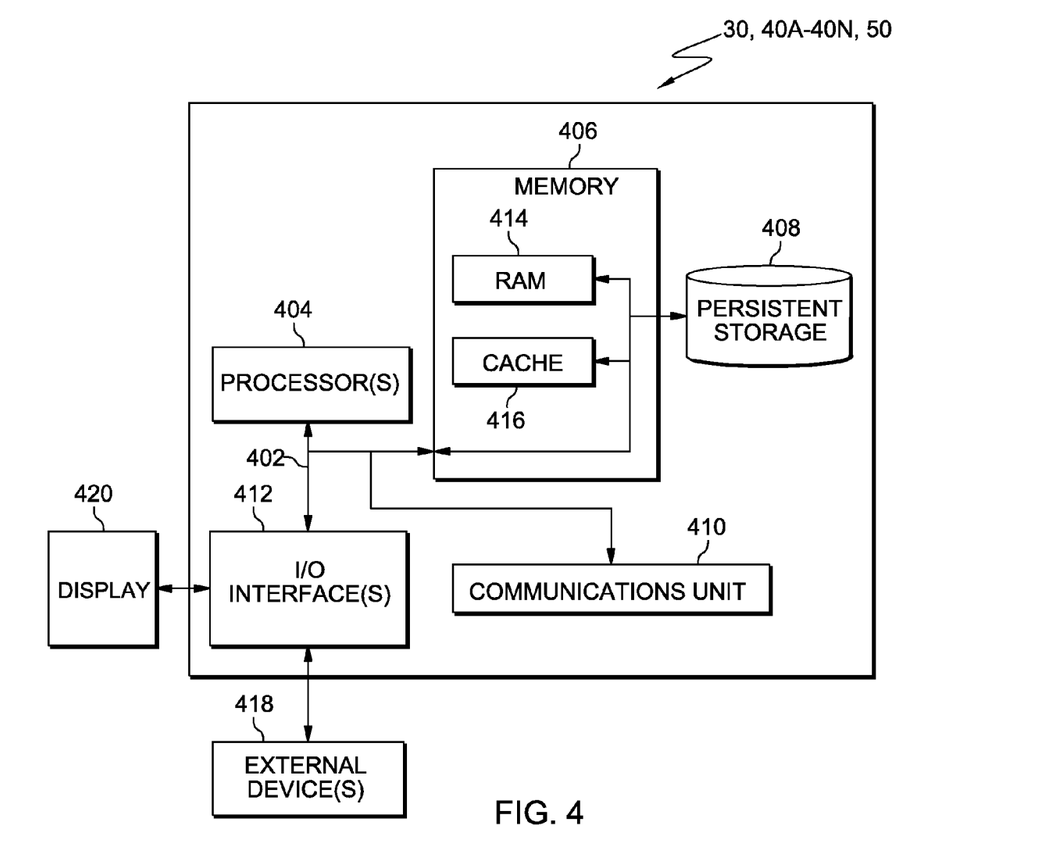
FIG. 4 depicts a block diagram of components of the servers and client computing devices, in accordance with one embodiment of the present invention.

FIG. 4 depicts a block diagram of components of server 30, client computing devices 40A-40N, and server 50 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server 30, client computing devices 40A-40N, and server 50 each include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

Game 110, game adjustment program 120, and feedback results database 130 are stored in persistent storage 408 of server 30 for execution and/or access by one or more of the respective computer processors 404 of server 30 via one or more memories of memory 406 of server 30. NLP/sentiment analyzer 310 is stored on persistent storage 408 of server 50 for execution by one or more of the respective computer processors 404 of server 50 via one or more memories of memory 406 of server 50. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Game 110 and game adjustment program 120 may be downloaded to persistent storage 408 of server 30 through communications unit 410. NLP/sentiment analyzer 310 may be downloaded to persistent storage 408 of server 50 through communications unit 410.

I/O interface(s) 412 allows for input and output of data with other devices that may be connected to server 30, client computing devices 40A-40N, and server 50. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., game 110, game adjustment program 120, and feedback results database 130, can be stored on such portable computer readable storage media and can be loaded onto persistent storage 408 of server 30 via I/O interface(s) 412 of server 30. Software and data used to practice embodiments of the present invention, e.g., NLP/sentiment analyzer 310, can be stored on such portable computer readable storage media and can be loaded onto persistent storage 408 of server 50 via I/O interface(s) 412 of server 50. I/O interface (s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for selecting a game element of a video game and adjusting the game element during execution of the video game, the method comprising:

displaying, by one or more processors, during executions of a video game, a list of possible game elements to be selected by a plurality of users of the video game;

retrieving, by one or more processors, a plurality of received game element feedback data from the plurality of users of the video game, wherein:
  the plurality of received game element feedback data was selected from the displayed list of possible game elements; and
  the plurality of received game element feedback data includes at least two different possible game elements selected by users of the plurality of users from the displayed list of possible game elements;

analyzing, by one or more processors, the plurality of received game element feedback data to determine a single game element of the list of possible game elements to be adjusted;

selecting, by one or more processors, the single game element to be adjusted, based upon the analyzed plurality of received game element feedback data; and causing, by one or more processors, the single game element to be adjusted during all of the executions of the video game presented to the plurality of users.

2. The method of claim 1, wherein the step of displaying the list of possible game elements to be selected by the plurality of users of the video game comprises:

generating a user interface, wherein the user interface provides an option for inputting game element feedback data based on the list of possible game elements;

receiving the game element feedback data; and adding the game element feedback data to the plurality of received game element feedback data.

3. The method of claim 2, wherein the step of generating the user interface comprises:

retrieving the list of possible game elements; and generating the user interface, wherein the user interface includes a series of selectable elements, wherein each selectable element contains one possible game element selection from the list of possible game element selections.

4. The method of claim 2, wherein:

the step of receiving the game element feedback data comprises receiving user-generated text as input to the user interface; and the step of analyzing, by one or more processors, the plurality of received game element feedback data to determine the single game element to be adjusted comprises analyzing, by one or more processors, the user-generated text to determine the single game element to be adjusted.

5. The method of claim 4, wherein the step of analyzing, by the one or more processors, the user-generated text to determine the single game element to be adjusted includes performing text analytics on the user-generated text, wherein text analytics includes natural language processing with one or more set of dictionaries and rules.

6. The method of claim 1, wherein:

each game element of the list of possible game element selections comprises an impression of difficulty for a portion of the video game previously presented to the user; and the step of selecting, by the one or more processors, the single game element of the list of possible game elements to be adjusted, based upon the analyzed plurality of received game element selections comprises selecting, by the one or more processors, an adjusted difficulty level for the portion of the video game previously presented to the user, based upon a plurality of received impressions of difficulty for the portion of the video game.

7. The method of claim 1, wherein each game element of the list of possible game element selections comprises a possible game plot element, wherein the possible game plot element includes multiple branches that affect direction of plot of the video game; and
   wherein the step of selecting, by the one or more processors, the single game element of the list of possible game elements to be adjusted, based upon the plurality of received game element selections comprises:
      selecting, by the one or more processors, a game plot element to be adjusted during execution of the video game, based upon a plurality of received game plot elements.

8. A computer program product for selecting a game element of a video game and adjusting the game element during execution of the video game, the computer program product comprising:
   one or more computer readable storage media and program instructions stored on the one or more computer readable storage media, the program instructions comprising:
   program instructions to display, during executions of a video game, a list of possible game elements to be selected by a plurality of users of the video game;
   program instructions to retrieve a plurality of received game element feedback data from the plurality of users of the video game, wherein:
      the plurality of received game element feedback data was selected from the displayed list of possible game elements; and
      the plurality of received game element feedback data includes at least two different possible game elements selected by users of the plurality of users from the displayed list of possible game elements;
   program instructions to analyze the plurality of received game element feedback data to determine a single game element of the list of possible game elements to be adjusted;
   program instructions to select the single game element to be adjusted, based upon the analyzed plurality of received game element feedback data; and
   program instructions to cause the single game element to be adjusted during all of the executions of the video game presented to the plurality of users.

9. The computer program product of claim 8, wherein program instructions to display the list of possible game elements to be selected by the plurality of users of the video game comprise:
   program instructions, stored on the one or more computer readable storage media, to generate a user interface, wherein the user interface provides an option for inputting game element feedback data based on the list of possible game elements;
   program instructions, stored on the one or more computer readable storage media, to receive the game element feedback data; and
   program instructions, stored on the one or more computer readable storage media, to add the game element feedback data to the plurality of received game element feedback data.

10. The computer program product of claim 9, wherein program instructions to generate the user interface comprise:
   program instructions to retrieve the list of possible game elements; and
   program instructions to generate the user interface, wherein the user interface includes a series of selectable elements, wherein each selectable element contains one possible game element selection from the list of possible game element selections.

11. The computer program product of claim 9, wherein:
   program instructions to receive the game element feedback data comprise program instructions to receive user-generated text as input to the user interface; and
   program instructions to analyze the plurality of received game element feedback data to determine the single game element to be adjusted comprise program instructions to analyze the user-generated text to determine the single game element to be adjusted.

12. The computer program product of claim 11, wherein program instructions to analyze the user-generated text to determine the single game element to be adjusted includes performing text analytics on the user-generated text, wherein text analytics includes natural language processing with one or more set of dictionaries and rules.

13. The computer program product of claim 11, wherein program instructions to analyze the user-generated text to determine the single game element to be adjusted comprise:
   program instructions to analyze the user-generated text to identify, at least, the single game element and a sentiment towards the single game element; and
   program instructions to determine an aspect of the single game element to adjust based on, at least, the sentiment towards the game element.

14. The computer program product of claim 8, wherein:
   each game element of the list of possible game element selections comprises an impression of difficulty for a portion of the video game previously presented to the user; and
   program instructions to select the single game element of the list of possible game elements to be adjusted, based upon the analyzed plurality of received game element selections comprise program instructions to select an adjusted difficulty level for the portion of the video game previously presented to the user, based upon a plurality of received impressions of difficulty for the portion of the video game.

15. The computer program product of claim 8, wherein each game element of the list of possible game element selections comprises a possible game plot element, wherein the possible game plot element includes multiple branches that affect direction of plot of the video game; and
   wherein program instructions to select the single game element of the list of possible game elements to be adjusted, based upon the plurality of received game element selections comprise:
   program instructions to select a game plot element to be adjusted during execution of the video game, based upon a plurality of received game plot elements.

16. The computer program product of claim 8, further comprising:
   program instructions, stored on the one or more computer readable storage media, to retrieve text from an online forum;
   program instructions, stored on the one or more computer readable storage media, to add the text as game element feedback data to the plurality of received game element feedback data; and
   wherein program instructions to select the single game element to be adjusted comprise program instructions to analyze the text to determine the single game element to be adjusted.

17. The computer program product of claim 8, wherein program instructions to cause the single game element to be adjusted during execution of the video game comprise:
  program instructions to rearrange an order of game sequences presented within the video game.

18. The computer program product of claim 8, wherein program instructions to analyze the plurality of received game element feedback data to determine the single game element of the list of possible game elements to be adjusted comprise:
  program instructions to generate a plurality of tuples from the plurality of received game element feedback data, wherein each tuple is generated from a received set of input text and includes: a game element, a sentiment, and a keyword indicating information associated with a moment in the video game to which the received set of input text applies.

19. A computer system for selecting a game element of a video game and adjusting the game element during execution of the video game, the computer system comprising:
  one or more computer processors, one or more computer readable storage media, and program instructions stored on the computer readable storage media for execution by at least one of the one or more processors, the program instructions comprising:
  program instructions to display, during executions of a video game, a list of possible game elements to be selected by a plurality of users of the video game;
  program instructions to retrieve a plurality of received game element feedback data from the plurality of users of the video game, wherein:
    the plurality of received game element feedback data was selected from the displayed list of possible game elements; and
    the plurality of received game element feedback data includes at least two different possible game elements selected by users of the plurality of users from the displayed list of possible game elements;
  program instructions to analyze the plurality of received game element feedback data to determine a single game element of the list of possible game elements to be adjusted;
  program instructions to select the single game element to be adjusted, based upon the analyzed plurality of received game element feedback data; and
  program instructions to cause the single game element to be adjusted during all of the executions of the video game presented to the plurality of users.

20. The computer system of claim 19, wherein program instructions to display the list of possible game elements to be selected by the plurality of users of the video game comprise:
  program instructions, stored on the computer readable storage media for execution by at least one of the one or more processors, to generate a user interface, wherein the user interface provides an option for inputting game element feedback data based on the list of possible game elements;
  program instructions, stored on the one or more computer readable storage media, to receive the game element feedback data; and
  program instructions, stored on the one or more computer readable storage media, to add the game element feedback data to the plurality of received game element feedback data.

* * * * *